United States Patent
Goh

(10) Patent No.: US 9,852,064 B2
(45) Date of Patent: Dec. 26, 2017

(54) METHOD, APPARATUS AND COMPUTER PROGRAM FOR MANAGEMENT OF FLASH MEMORY

(71) Applicant: FCI, Inc., Gyeonggi-do (KR)

(72) Inventor: Hyungil Goh, Gyeonggi-do (KR)

(73) Assignee: FCI, Inc., Gyeonggi-Do (KR)

( * ) Notice: Subject to any disclaimer, the term of this patent is extended or adjusted under 35 U.S.C. 154(b) by 54 days.

(21) Appl. No.: 15/073,179

(22) Filed: Mar. 17, 2016

(65) Prior Publication Data

US 2017/0123970 A1  May 4, 2017

(30) Foreign Application Priority Data

Oct. 30, 2015  (KR) .................. 10-2015-0152024

(51) Int. Cl.
*G06F 12/02*  (2006.01)
*G06F 13/16*  (2006.01)
*G06F 9/30*   (2006.01)

(52) U.S. Cl.
CPC ........ *G06F 12/0246* (2013.01); *G06F 9/3004* (2013.01); *G06F 13/1668* (2013.01); *G06F 2212/2022* (2013.01)

(58) Field of Classification Search
None
See application file for complete search history.

(56) References Cited

U.S. PATENT DOCUMENTS

| | | | |
|---|---|---|---|
| 8,006,062 B1 * | 8/2011 | Cheng ................... | G06F 9/4401 711/104 |
| 9,389,805 B2 * | 7/2016 | Cohen .................... | G06F 3/0679 |
| 2003/0151939 A1 * | 8/2003 | LaBerge ............. | G06F 13/4234 365/63 |
| 2007/0058470 A1 * | 3/2007 | Nierle ...................... | G11C 5/04 365/221 |
| 2007/0260890 A1 * | 11/2007 | Bandholz .............. | G06F 21/105 713/193 |
| 2008/0189452 A1 * | 8/2008 | Merry .................... | G06F 3/061 710/56 |
| 2009/0113144 A1 * | 4/2009 | Tokunaga ........... | G06F 9/44505 711/154 |
| 2011/0004719 A1 * | 1/2011 | Fitzgerald .......... | G11C 16/0408 711/1 |
| 2012/0221825 A1 * | 8/2012 | Kim .................... | G06F 13/1694 711/170 |

(Continued)

OTHER PUBLICATIONS

MXIC (SFDP Introduction) Sep. 23, 2011, pp. 1-15.*

*Primary Examiner* — Kaushikkumar Patel
(74) *Attorney, Agent, or Firm* — Kirton McConkie; Evan R. Witt

(57) ABSTRACT

A system on chip includes a memory information read unit and a memory feature setting unit. The memory information read unit is configured to read standard integrated information using a first instruction or read standard information using a second instruction from at least one of the memory and an application image. The memory feature setting unit is configured to set a feature of the memory using the standard integrated information or the standard information. The memory feature setting unit selects all or some of a plurality of bus access modes defined in the standard integrated information or in the standard information and sets a bus access mode of the memory as one or more of the bus access modes.

16 Claims, 3 Drawing Sheets

(56) References Cited

U.S. PATENT DOCUMENTS

2015/0074359 A1* 3/2015 Sunagawa ........... G06F 13/1694
                                                    711/158
2017/0060422 A1* 3/2017 Sharifie ................ G06F 3/0604

* cited by examiner

METHOD, APPARATUS AND COMPUTER PROGRAM FOR MANAGEMENT OF FLASH MEMORY

FIELD OF THE INVENTION

The invention relates to a method, apparatus, and computer program for performing integrated management of information regarding a serial flash memory.

BACKGROUND OF THE INVENTION

This section is intended to merely provide background for the invention and is not prior art to the claims.

Serial flash memories use different instructions and operate in different manners, depending on manufacturers. In order for technology standardization, the Joint Electronic Device Engineering Council (JEDEC) has been standardizing the serial flash memories (JEDEC Standard No. 216: Serial Flash Discoverable Parameters (SFDP)).

In the SFDP, a header, a parameter header, a basic parameter table, a sector map parameter table, and a basic instruction table are configured to form a tree structure. The header and the parameter header include information regarding the tables. The basis parameter table, the sector map parameter table, and the basic instruction table include information regarding the serial flash memories. In order to acquire such information about the memory, a 3-stage search process is needed, causing a time delay during the search process.

In the SFDP, functions of the memory are either supported with restrictions or not supported at all. For example, in order to restrict a write function, the SFDP only supports a block protection function while not supporting a persistent protection function and a dynamic protection function at all. Accordingly, integrated information for supporting various functions of the memory is required.

In addition, the SFDP does not consider performance of each memory. For example, a bus access mode of the memory has a different speed limit for each mode, and the SFDP does not consider the difference and is set to operate at a low speed. Accordingly, integrated information for properly using the performance of the memory is required.

Actually, because manufacturers produce models that support the SFDP together with models that do not support the SFDP, integrated management of the additional information apart from the information defined in the SFDP is required.

A memory management method and apparatus to solve the above-described problems have not been implemented yet.

SUMMARY OF THE INVENTION

The inventor of the present invention recognizes the problems of the conventional SFDP information and intends to newly define the standard integrated information that includes a pseudo basic parameter table, an additional parameter table, and a comprehensive command table.

Embodiments of the present invention are mainly intended to perform integrated management of memory information to support various functions of a serial flash memory and evaluate performance of the memory by using the standard integrated information.

Other objects of the present invention that are not specifically described herein may also be considered as long as they may be easily inferred from the following description and its effect.

According to an aspect of the invention, there is provided an apparatus for managing a memory, the apparatus including a memory information read unit configured to read standard integrated information using a first instruction or read standard information using a second instruction from at least one of the memory and an application image and a memory feature setting unit configured to set a feature of the memory using the standard integrated information or the standard information.

The memory management apparatus may further include one or more of the following features.

The first instruction and the second instruction may be different from each other.

The standard integrated information may include a pseudo basic parameter table, an additional parameter table, and a comprehensive command table.

The standard information may have a header, a parameter header, a basic parameter table, a sector map parameter table, and a basic instruction table configured in a tree structure.

The memory feature setting unit may select all or some of a plurality of bus access modes defined in the standard integrated information or in the standard information and may set a bus access mode of the memory as one of all or some of the bus access modes, in which the plurality of defined bus access modes are formed by combining one or more pins associated with a command, one or more pins associated with an address, and one or more pins associated with data.

The memory feature setting unit may set a protection function of the memory as at least one of a plurality of protection types defined in the standard integrated information or the standard information.

The memory feature setting unit may set a sector map of the memory as at least one of a plurality of sector units defined in the standard integrated information or the standard information.

The apparatus may further include a memory information determination unit configured to determine whether the standard integrated information is present or determine whether the standard information corresponds to a designated model or undesignated model. The apparatus may further include a memory information write unit configured to write or change all or some of the standard integrated information in at least one of the memory and the application image.

The apparatus may further include a command execution unit configured to execute a command defined in the standard integrated information.

According to another aspect of the invention, there is provided a method of managing a memory using a memory management apparatus, the method including reading standard integrated information from at least one of the memory and an application image using a first instruction; determining whether the standard integrated information is present; and setting a feature of the memory using the standard integrated information.

According to another aspect of the invention, there is provided a computer program recorded on a tangible computer-readable medium including computer program instructions executable by a processor, the computer program including reading standard integrated information from at least one of the memory and an application image using a first instruction and setting a feature of the memory using the standard integrated information when the computer program instructions are executed by the processor.

According to another aspect of the invention, there is provided a method of managing a memory installed in a product driven with an application image, the method including setting a feature of the memory using standard integrated information including a pseudo basic parameter table, an additional parameter table, and a comprehensive command table when the product is booted.

According to another aspect of the invention, there is provided a method of managing a memory using a memory management apparatus, the method including reading standard integrated information from at least one of the memory and an application image using a first instruction and setting a feature of the memory using the standard integrated information.

According to another aspect of the invention, there is a provided a memory to which standard integrated information including a pseudo basic parameter table, an additional parameter table, and a comprehensive command table is written.

As described above, according to embodiments of the present invention, it is possible to avoid complicated searches and thus enhance the search speed by using standard integrated information having a simplified memory information structure.

According to embodiments of the present invention, it is also possible to perform integrated management of a model that does not support the existing standard information by using the standard integrated information, e.g., perform integrated management of a SFDP supporting model along with a model that does not support SFDP.

According to embodiments of the present invention, it is also possible to unify the management of the memory by using the standard integrated information, since a serial flash memory model need not be managed for each version of the standard information, e.g., serial flash memories with different SFDP versions.

According to embodiments of the present invention, it is also possible to use the memory without limiting functions of the memory by using the standard integrated information which may use the various functions of the serial flash memory.

According to embodiments of the present invention, it is also possible to achieve the maximum performance for each memory by using the standard integrated information which may consider the feature of the serial flash memory.

According to embodiments of the present invention, a manufacturer may use various commands needed for each memory by using the standard integrated information which may support the various commands.

Various effects other than those described above may be disclosed directly or suggestively in the detailed description according to the following exemplary embodiment of the present invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF THE PREFERRED EMBODIMENTS

In the following description, when a detailed description of the known relevant functions, which would be obvious to those skilled in the art, is determined to unnecessarily obscure the gist of the present invention, the detailed description thereof will be omitted. Some embodiments of the present invention will be described in detail with reference to the exemplary drawings.

Figure 1:
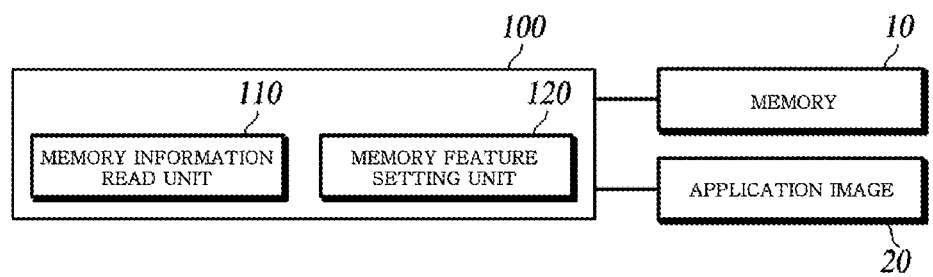
FIG. 1 is a simplified block diagram illustrating a memory management apparatus according to an embodiment of the present invention.

FIG. 1 is a block diagram illustrating a memory management apparatus according to an embodiment of the present invention. FIG. 1 shows a functional block representing a memory 10. Generally, examples of the memory include volatile memories, such as a dynamic random access memory (DRAM) and a static random access memory (SRAM), and non-volatile memories such as an electrically erasable programmable read only memory (EEPROM), a ferroelectrics random access memory (FRAM), a phase-change random access memory (PRAM), a magnetic random access memory (MRAM), and a flash memory. The volatile memory may lose stored data when power is cut off, and the non-volatile memory may conserve stored data even when power is cut off. Particularly, the flash memory advantageously has high programming speed, low power consumption, large data storage capacity, and the like, and thus is widely used as a storage medium in a computer system, etc. The flash memory is divided into a parallel flash memory and a serial flash memory. A parallel flash memory has cells arranged in parallel between a bit line and a ground line while a serial flash memory has cells arranged in series between the bit line and the ground line. For the memory management apparatus according to the embodiment, the serial flash memory is described as an example. However, embodiments of the present invention are not limited thereto and may also be applied to a different type of memory if necessary.

As shown in FIG. 1, a memory management apparatus 100 according to the embodiment includes a memory information read unit 110 and a memory feature setting unit 120.

The memory information read unit 110 uses a first instruction to read standard integrated information from at least one of a memory 10 and an application image 20. The memory information read unit 110 uses a second instruction to read standard information from at least one of the memory and the application image 20.

The application image 20, which is a data file that includes a type of program for driving a product equipped with the memory 10, may be implemented in hardware, firmware, software, or a combination thereof.

The first instruction and the second instruction correspond to predesignated instructions that may read information regarding the memory 10. The first instruction and the second instruction are different from each other. Here, the first instruction is an instruction that is arbitrarily designated by those skilled in the art. For example, a typical read instruction is represented as a hexadecimal value 03 h, but is not limited thereto. The second instruction is an instruction that has been designated during standardization. For example, the instruction designated in the standard is 5 Ah, but is not limited thereto.

The standard integrated information denotes a group of information that is newly defined to widely include information regarding the memory 10. The standard information denotes an information group that is predefined to include some of the information regarding the memory 10. Details of the standard integrated information and the standard information will be described below with reference to FIGS. 3 and 4.

The memory feature setting unit 120 uses the standard integrated information or the standard information to set a feature of the memory 10. The feature of the memory 10, in addition to basic operation for reading data from or writing data to the memory 10, conceptually includes whether to perform various operations on the memory 10, the extent of the operation, and the attribute needed to operate the memory 10 for a specific purpose.

The memory feature setting unit 120 may set a bus access mode of the memory 10 as any one of a plurality of bus access modes defined in the standard integrated information or the standard information. For example, representatively, there may be a serial peripheral interface (SPI) in the bus access mode. Here, the SPI uses one pin of the memory to input a command, an address, and data.

The bus access mode may be extended to a dual serial peripheral interface (DSPI) and a quad serial peripheral interface (QSPI) in addition to the SPI. In terms of hardware, the DSPI uses two pins of the memory, and the QSPI uses four pins of the memory.

A plurality of defined bus access modes may be formed by combining one or more pins associated with the command, one or more pins associated with the address, and one or more pins associated with the data. For example, the combination may be made of one pin associated with the command, one pin associated with the address, and one pin associated with the data. Alternatively, the combination may be formed by two pins associated with the command, two pins associated with the address, and two pins associated with the data. Alternatively, the combination is formed by four pins associated with the command, four pins associated with the address, and four pins associated with the data. Here, the number of pins associated with the command, the number of pins associated the address, and the number of pins associated with the data need not be equal. Basically, the command, the address, and the data are formed in units of bytes.

The memory feature setting unit 120 may set a protection function for the memory 10 as at least one protection type among a plurality of protection types defined in the standard integrated information or the standard information. Examples of the plurality of defined protection types may include block protection, persistent protection, and dynamic protection for restricting a write to the memory.

The memory feature setting unit 120 may set a sector map of the memory 10 in at least one of a plurality of sector units defined in the standard integrated information or the standard information. For example, the plurality of defined sector units may include 4, 32, and 64 Kbytes (KB).

The sector map has map information regarding sectors. Here, the sector is a basic unit of a memory region and denotes a unit in which the memory performs an erase operation. A flash memory performs a read operation, a write operation, and an erase operation, and the respective basic units of the memory region needed to perform the operations are different from one another. In addition, speeds for performing the operations are different from one another. In order to enhance the operating speed of a flash memory, the number of times each operation is performed and the size of the memory region need to be considered.

Figure 2:
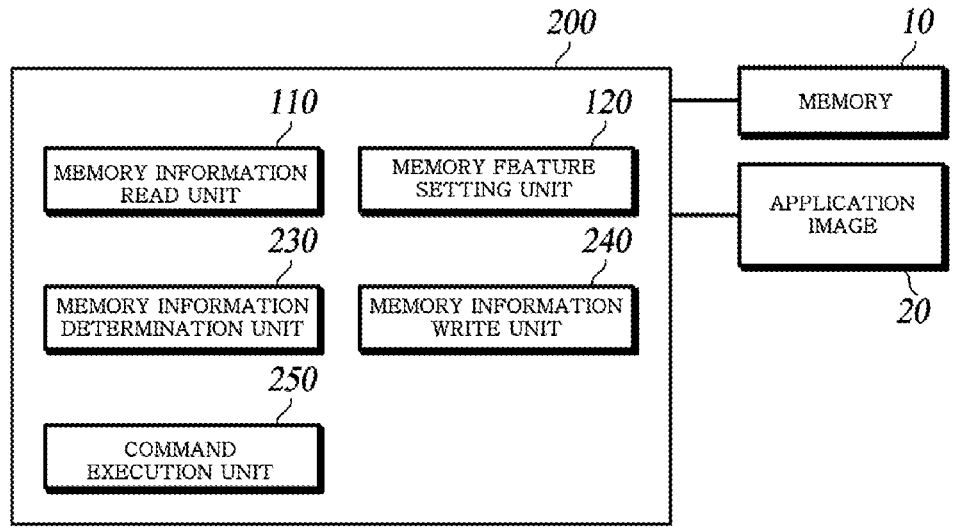
FIG. 2 is a detailed block diagram illustrating a memory management apparatus according to an embodiment of the present invention.

FIG. 2 is a detailed block diagram illustrating a memory management apparatus according to an embodiment of the present invention. As shown in FIG. 2, a memory management apparatus 200 according to an embodiment of the present invention includes a memory information read unit 110, a memory feature setting unit 120, a memory information determination unit 230, a memory information write unit 240, and a command execution unit 250. These components may be implemented as a single device or separate devices that are spaced apart from one another. The memory information read unit 110 and the memory feature setting unit 120 shown in FIG. 2 have been described with reference to FIG. 1. Accordingly, the following description will be made on the assumption that these components are provided.

The memory information determination unit 230 determines whether the standard integrated information is present or whether the standard information corresponds to a designated model or an undesignated model.

The designated model denotes a standard that is designated among a plurality of versions which may be created when the standard defined by the Joint Electronic Device Engineering Council (JEDEC) is revised. For example, the designated model may include JESD216A and JESD216B.

The undesignated model denotes a standard that is not designated among the plurality of versions. For example, the undesignated model may include JESD216.

The memory information write unit 240 writes or changes all or some of the standard integrated information to at least one of the memory 10 and the application image 20. For example, the memory information write unit 240 writes the standard integrated information, such as a protection type, a bus speed limit, a mini sector map, and a comprehensive command, to the memory 10, changes the contents of the information, or changes a memory region and then writes the contents of the information to the changed memory region. The memory information write unit 240 writes the standard integrated information, such as a protection type, a bus speed limit, a mini sector map, and a comprehensive command, to the application image 20, changes the contents of the information, or changes a memory region and then writes the contents of the information to the changed memory region.

The command execution unit 250 executes a command defined in the standard integrated information. A manufacturer may define various commands so that the memory may perform various functions, as needed. The command execution unit 250 executes these commands. For example, examples of the defined commands may include a one-time programmable (OTP)-associated command, a memory-security-associated command, etc.

Figure 3:
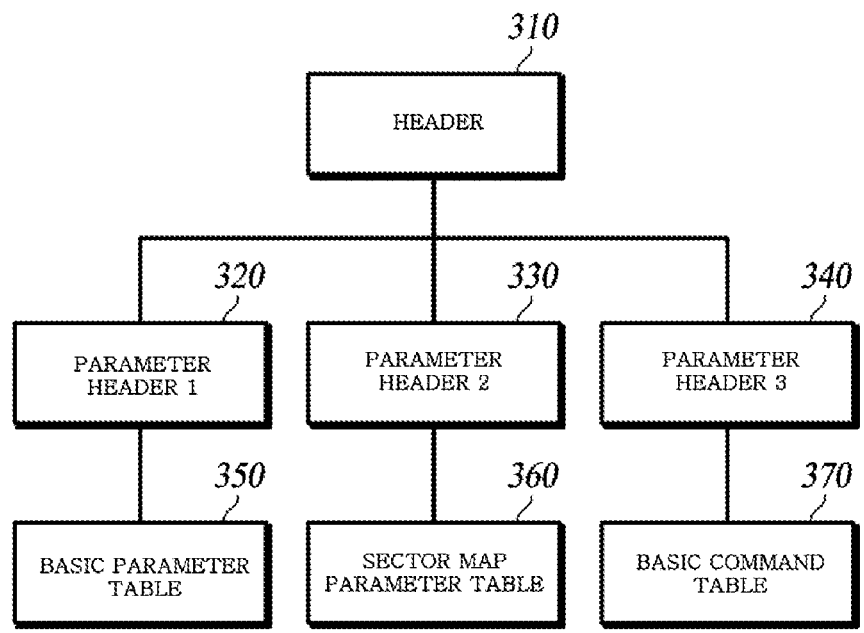
FIG. 3 is a diagram illustrating standard information regarding a memory according to embodiments of the present invention.

FIG. 3 is a diagram illustrating standard information according to embodiments of the present invention. As shown in FIG. 3, the standard information, which is an information group that is previously defined to include some of the information regarding the memory, includes a header 310, parameter headers 320, 330, and 340, a basic parameter table 350, a sector map parameter table 360, and a basic command table 370. For example, the standard information may include the standard of serial flash memories defined by the Joint Electronic Device Engineering Council (JEDEC) (JEDEC Standard No. 216: Serial Flash Discoverable Parameters, (SFDP)).

The header 310 includes information regarding the number of parameter headers. For convenience of description, FIG. 3 illustrates three parameters, but the standard information may include a different number of parameter headers. The parameter headers 320, 330, and 340 include information regarding an address and a length of a table. The table includes information needed to perform an operation of the flash memory.

The basic parameter table 350 includes basic information of the flash memory, a bus access mode, and information regarding a read method and an erase method of the bus access mode. The sector map parameter table 360 includes information regarding an erase command and a sector map, which are supported differently depending on the size of the sector. The basic command table 370 includes information regarding a command that supports an address formed of 4 bytes.

As shown in FIG. 3, the header 310, the parameter headers 320, 330, and 340, the basic parameter table 350, the sector map parameter table 360, and the basic command table 370 are configured to form a tree structure. The sizes of the header 310, the parameter headers 320, 330, and 340, and the basic command table 370 may all be two double words (DWORDs) or eight bytes. The size of the basic parameter table 350 may be sixteen DWORDs. The size of the sector map parameter table 360 may be fourteen DWORDs. Embodiments of the present invention are not limited thereto.

When the standard information is used to acquire the memory information, a read operation may be repeated several times in the bus access mode formed by combining one pin associated with the command, one pin associated with the address, and one pin associated with the data. In order to acquire information written in the table, a 3-stage search process is needed from the beginning of the header 310, thereby causing a time delay. Here, the 3-stage search process denotes reading a header, reading a parameter header, and reading a table. Accordingly, the number of searches may be from three up to seven.

Figure 4:
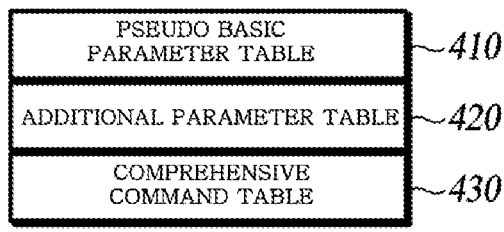
FIG. 4 is a diagram illustrating standard integrated information regarding a memory according to embodiments of the present invention.

FIG. 4 is a diagram illustrating standard integrated information according to embodiments of the present invention. As shown in FIG. 4, the standard integrated information, which is an information group that is newly defined to widely include the information regarding the memory, includes a pseudo basic parameter table 410, an additional parameter table 420, and a comprehensive command table 430.

The pseudo basic parameter table 410 may be substituted for the basic parameter table 350 and may include the basic parameter table 350. In other words, the pseudo basic parameter table 410 does not include the header 310 and the parameter headers 320, 330, and 340 included in the standard information. The pseudo basic parameter table 410 includes an identity (ID), a parameter length, etc.

The additional parameter table 420 is a table for adding an undefined memory feature to the standard information and includes information regarding a protection type for restricting a write operation on the memory, a mini sector map for replacing the sector map table, and a performance level that may be set for each bus access mode.

For example, the protection type may include block protection, permanent protection, and dynamic protection, and the performance level that may be set for each bus access mode may include a speed limit for a bus access.

The comprehensive command table 430 may include various commands for enabling the memory to perform various functions. For example, examples of the commands may include a one-time programmable (OTP)-associated command, a memory-security-associated command, etc., and may include various commands defined by a manufacturer as needed.

The sizes of the pseudo basic parameter table 410 may be sixteen DWORDs. The size of the additional parameter table 420 may be seven DWORDs. The size of the comprehensive command table 430 may be twenty-one DWORDs. Embodiments of the present invention are not limited thereto.

Unlike the standard information having the tree structure of FIG. 3, the standard integrated information shown in FIG. 4 may be formed in a simple combination on the pseudo basic parameter table 410, the additional parameter table 420, and the comprehensive command table 430. Thus, a complicated search process such as the 3-stage search is not needed to obtain the memory information, and thus the search speed may be improved.

Figure 5:
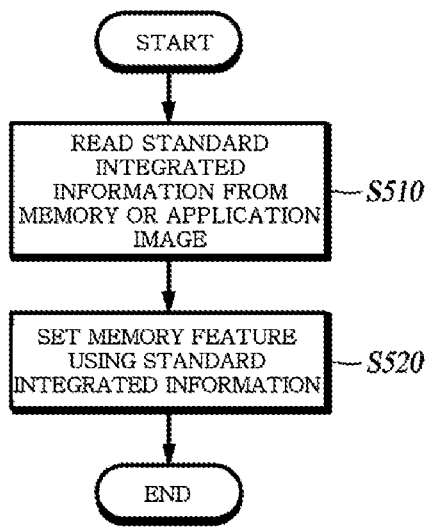
FIG. 5 is a flowchart illustrating a memory management method according to an embodiment of the present invention.

FIG. 5 is a flowchart illustrating a memory management method according to an embodiment of the present invention. The method is a memory management method of the memory management apparatus 100, which has been described with reference to FIG. 1.

In S510, standard integrated information is read from at least one of the memory 10 and the application image 20 using a first instruction. Here, the standard integrated information is standard integrated information that has been described with reference to FIG. 4, and includes the pseudo basic parameter table 410, the additional parameter table 420, and the comprehensive command table 430.

The memory management apparatus 100 may complete searching for the memory information with one read process. In this case, a bus access mode formed by combining one pin associated with the command, one pin associated with the address, and one pin associated with the data is used.

The first instruction is an instruction that is arbitrarily defined by those skilled in the art. For example, a typical read instruction is represented as a hexadecimal value 03 h, but is not limited thereto.

In S520, a feature of the memory 10 is set using the standard integrated information. Here, the feature of the memory 10, in addition to basic operations for reading data from or writing data to the memory 10, conceptually includes whether to perform various operations on the memory 10, the extent of the operation, and the attribute needed to operate the memory 10 for a specific purpose. For example, the feature of the memory 10 may include a bus access mode, a protection function type, a sector map unit, etc.

According to the embodiments, by using standard integrated information newly defined to widely include the information regarding the memory 10, it is possible to use the memory without restricting the function of the memory, achieve the maximum performance for each memory, and allow a manufacturer to use various commands needed for each memory.

Figure 6:
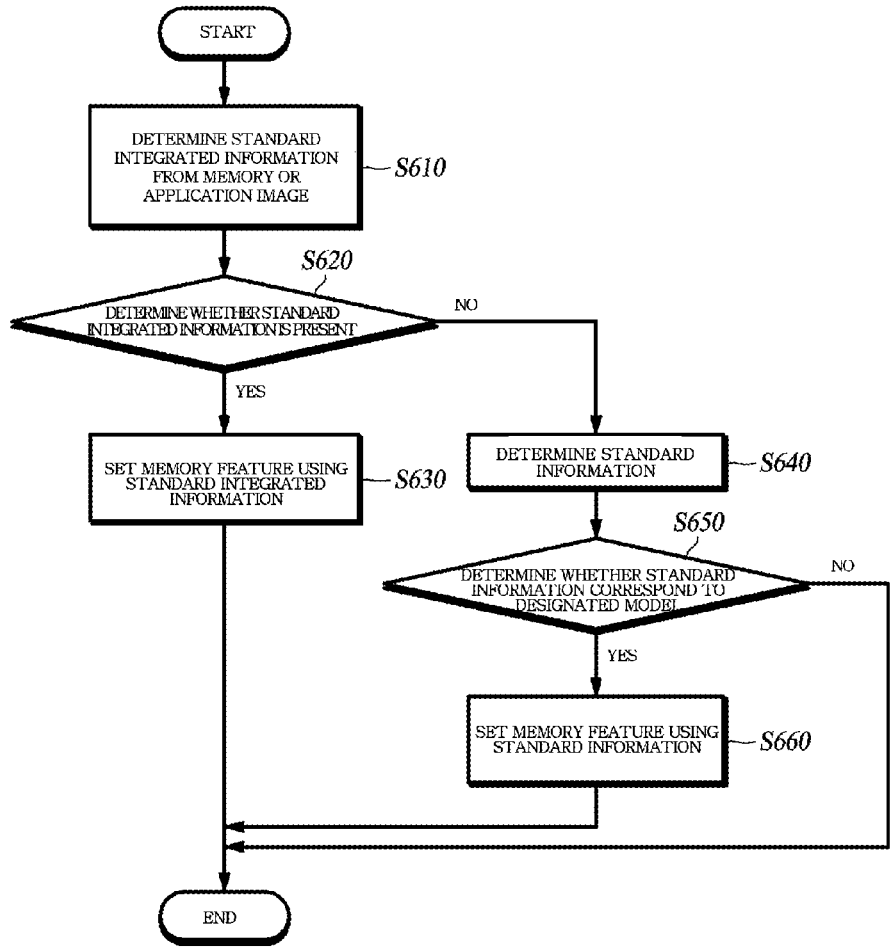
FIG. 6 is a flowchart illustrating a memory management method according to another embodiment of the present invention.

FIG. 6 is a flowchart illustrating a memory management method according to another embodiment of the present invention. The method is a memory management method of the memory management apparatus 200 which has been described with reference to FIG. 2. Unlike the memory management method described with reference to FIG. 5, the embodiment further includes determining whether the standard integrated information is present or determining whether the standard information corresponds to a designated model or an undesignated model.

In S610, the standard integrated information is read from at least one of the memory 10 and the application image 20 using a first instruction. Here, the standard integrated information is standard integrated information that has been described with reference to FIG. 4, and includes the pseudo basic parameter table 410, the additional parameter table 420, and the comprehensive command table 430.

In S620, the memory information determination unit 230 determines whether the standard integrated information is present. Here, the standard integrated information is the standard integrated information that has been described with reference to FIG. 4.

In S630, the feature of the memory 10 is set using the standard integrated information. Here, the feature of the memory 10 conceptually includes, in addition to basic operations for reading data from or writing data to the memory 10, whether to perform various operations on the memory 10 and the attribute needed to operate the memory 10 for a specific purpose. For example, the feature of the memory 10 may include a bus access mode, a protection function type, a sector map unit, etc.

The memory management method according to the embodiment may additionally include reading the standard information (S640). In S640, when the standard integrated information is not present, the memory information read unit 110 uses a second instruction to read the standard information from at least one of the memory 10 and the application image 20.

Here, the second instruction is an instruction that is previously defined during standardization. For example, the second instruction is represented as a hexadecimal value 5 Ah, but is not limited thereto.

In S650, the memory information determination unit 230 further includes determining whether the standard information corresponds to the designated model (S650). Here, the designated model is a standard that is designated among a plurality of versions, which are created during the standardization as the standard information. For example, the SFDP may include JESD216A and JESD216B.

In S660, when the standard information corresponds to the designated model, the memory feature setting unit 120 sets the feature of the memory 10 using the standard information.

When a result of the determination in S650 is that the standard information does not correspond to the designated model, a typical memory operation is performed without needing to use the standard information. For example, when the standard information does not correspond to the designated model, there may be an undesignated model, undefined information, etc. Here, a typical memory operation may include a data read operation. For example, the read operation may be performed in a bus access mode formed by combining one pin associated with the command, one pin associated with the address, and one pin associated with the data. In this case, the instruction may be 03 h, but is not limited thereto.

According to the embodiments, by using the standard integrated information newly defined to widely include the information regarding the memory 10, it is possible to manage existing standard information, for example, a model that does not support the SFDP, together with a model that supports the SFDP, and thus it make an advantage of unifying management of the memory models without needing to manage a serial flash memory model for each version of the SFDP.

A memory management method according to another embodiment of the present invention will be described below. Unlike the memory management method described with reference to FIGS. 5 and 6, the memory management method according to the embodiment relates to a method of performing integrated memory management while booting a product equipped with the memory or downloading an application image.

The memory management method according to the embodiment corresponds to a method of managing the memory, which is installed in the product driven with the application image, using the memory management apparatus. The memory management method according to the embodiment includes using the standard integrated information including the pseudo basic parameter table, the additional parameter table, and the comprehensive command table to set the feature of the memory when the product is booted.

Here, the application image, which is a data file including a type of program for driving a product equipped with the memory 10, may be implemented in hardware, firmware, software, or a combination thereof.

The memory management method according to the embodiment may further include at least one of containing the standard integrated information in the application image, downloading the application image including the standard integrated information in a storage medium, writing or changing all or some of the standard integrated information included in the application image or the memory, and setting some region of the memory for writing the standard integrated information.

Generally, the memory management method includes downloading the application image again after downloading download software for programming a flash memory. One download process may be omitted by building the memory management method, apparatus, and computer program according to embodiments of the present invention into a system on chip (SOC). Accordingly, two download processes may be reduced to one download process.

According to the embodiments, it is possible to support various functions without uniformly restricting the performance of the memory, thereby operating the memory at an optimal speed during an initial booting process. Thus, the booting speed of the product equipped with the memory may be improved.

Although the steps of FIGS. 5 and 6 have been described as being sequentially performed, this is only an exemplary description. It will be appreciated by those skilled in the art that various modifications and changes may be made by changing the orders described in FIGS. 5 and 6, executing one or more steps in parallel, or adding another step, without departing from the essential characteristics of embodiments of the present invention.

The apparatus according to the embodiments may denote various apparatuses including all or some of a communication device, such as a communication modem configured to perform communication with various devices or a wired or wireless communication network, etc., a memory configured to store data for executing programs, and a microprocessor configured to execute programs to perform operations or commands Here, the apparatus may be implemented in a logic circuit in hardware, firmware, software, or a combination thereof, and may be implemented using a general-purpose or special-purpose computer. The apparatus may be implemented using a hardwired device, a field programmable gate array (FPGA), an application specific integrated circuit (ASIC), etc. In addition, the apparatus may be implemented as an SOC including one or more processors and controllers.

The method according to the embodiments may be implemented as program instructions executable by a variety of computers and recorded on a computer-readable medium. The computer-readable medium denotes any medium that participates in providing instructions to a processor for the execution. The computer-readable medium may include a program instruction, a data file, a data structure, or a combination thereof. For example, the computer-readable medium may include a magnetic medium, an optical recording medium, and a memory and may be embodied in the form of a transmitted signal wave. The computer program may also be distributed throughout a computer system connected over a network so that the computer-readable codes may be stored and executed in a distributed fashion. Also, functional programs, codes, and code segments for implementing the embodiment can be easily inferred by programmers skilled in the art to which the invention pertains.

It should be understood that the embodiments disclosed herein are merely illustrative and are not intended to limit the scope of the invention. The scope of the invention should be determined by the following claims and their appropriate legal equivalents should be construed as falling within the scope of the invention.

What is claimed is:

1. A system on chip for managing memory, the system on chip comprising:
    a memory information read unit configured to read standard integrated information using a first instruction or read standard information using a second instruction from at least one of the memory and an application image; and
    a memory feature setting unit configured to set a feature of the memory using the standard integrated information or the standard information, wherein the memory feature setting unit selects all or some of a plurality of bus access modes defined in the standard integrated information or in the standard information and sets a bus access mode of the memory as one of all or some of the bus access modes, wherein the plurality of defined bus access modes are formed by combining one or more pins associated with a command, one or more pins associated with an address, and one or more pins associated with data.

2. The system on chip of claim 1, wherein the first instruction and the second instruction are different from each other.

3. The system on chip of claim 1, wherein the standard integrated information comprises a pseudo basic parameter table, an additional parameter table, and a comprehensive command table.

4. The system on chip of claim 1, wherein the memory feature setting unit sets a protection function of the memory as at least one of a plurality of protection types defined in the standard integrated information or the standard information.

5. The system on chip of claim 1, wherein the memory feature setting unit sets a sector map of the memory as at least one of a plurality of sector units defined in the standard integrated information or the standard information.

6. The system on chip of claim 1, further comprising a memory information determination unit configured to determine whether the standard integrated information is present or configured to determine whether the standard information corresponds to a designated model or undesignated model.

7. The system on chip of claim 1, further comprising a memory information write unit configured to write or change all or some of the standard integrated information in at least one of the memory and the application image.

8. The system on chip of claim 1, further comprising a command execution unit configured to execute a command defined in the standard integrated information.

9. The system on chip of claim 1, wherein the standard integrated information comprises a pseudo basic parameter table, an additional parameter table, and a comprehensive command table.

10. A method of managing memory using a memory management apparatus, the method comprising:
    determining whether standard integrated information is present by a memory information determination unit;
    reading the standard integrated information from at least one of the memory and an application image using a first instruction by a memory information read unit if the standard integrated information is present;
    setting a feature of the memory using the standard integrated information by a memory feature setting unit;
    selecting all or some of a plurality of bus access modes defined in the standard integrated information by the memory feature setting unit;
    setting a bus access mode of the memory as one of all or some of the bus access modes by the memory feature setting unit; and
    forming the plurality of defined bus access modes by combining one or more pins associated with a command, one or more pins associated with an address, and one or more pins associated with data.

11. The method of claim 10, further comprising reading standard information from at least one of the memory and the application image using a second instruction when the standard integrated information is not present.

12. The method of claim 11, further comprising:
    determining whether the standard information corresponds to a designated model; and
    setting the feature of the memory using the standard information when the standard information corresponds to the designated model.

13. The method of claim 10, further comprising writing or changing all or some of the standard integrated information in at least one of the memory and the application image.

14. The method of claim 10,
    wherein the standard integrated information comprises a pseudo basic parameter table, an additional parameter table, and a comprehensive command table.

15. A non-transitory computer-readable medium managing memory, the non-transitory computer-readable medium comprising computer program instructions, the computer program instructions performing a process when executed by a processor, the process comprising:
    determining whether standard integrated information is present by a memory information determination unit
    reading the standard integrated information from at least one of the memory and an application image using a first instruction by the memory information read unit if the standard integrated information is present;
    setting a feature of the memory using the standard integrated information by a memory feature setting unit;

selecting all or some of a plurality of bus access modes defined in the standard integrated information by the memory feature setting unit;

setting a bus access mode of the memory as one of all or some of the bus access modes by the memory feature setting unit; and forming the plurality of defined bus access modes by combining one or more pins associated with a command, one or more pins associated with an address, and one or more pins associated with data.

16. The non-transitory computer-readable medium of claim 15, wherein the process further comprises reading standard information from at least one of the memory and the application image using a second instruction when the standard integrated information is not present.

* * * * *